United States Patent
Vaczi

(12) 
(10) Patent No.: US 8,593,009 B1
(45) Date of Patent: Nov. 26, 2013

(54) POWER GENERATOR SYSTEM

(76) Inventor: George C. Vaczi, Palm Harbor, FL (US)

(*) Notice: Subject to any disclaimer, the term of this patent is extended or adjusted under 35 U.S.C. 154(b) by 259 days.

(21) Appl. No.: 13/068,182

(22) Filed: May 4, 2011

Related U.S. Application Data

(60) Provisional application No. 61/395,724, filed on May 17, 2010.

(51) Int. Cl.
*F03B 13/00* (2006.01)

(52) U.S. Cl.
USPC .................................................. 290/55

(58) Field of Classification Search
USPC ............................. 290/55; 415/2.1
See application file for complete search history.

(56) References Cited

U.S. PATENT DOCUMENTS

| | | | |
|---|---|---|---|
| 419,345 A * | 1/1890 | Otto | 415/4.2 |
| 2,335,817 A * | 11/1943 | Topalov | 415/4.4 |
| 3,928,771 A * | 12/1975 | Straumsnes | 290/43 |
| 4,017,204 A * | 4/1977 | Sellman | 415/4.4 |
| 4,074,951 A * | 2/1978 | Hudson | 415/2.1 |
| 4,606,697 A * | 8/1986 | Appel | 415/4.4 |
| 5,969,430 A * | 10/1999 | Forrey | 290/54 |
| 6,674,181 B2 * | 1/2004 | Harbison | 290/55 |
| 7,417,334 B2 * | 8/2008 | Uchiyama | 290/55 |
| 7,462,950 B2 * | 12/2008 | Hu | 290/55 |
| 2006/0120872 A1 * | 6/2006 | Okubo et al. | 416/132 B |
| 2010/0111689 A1 * | 5/2010 | Davis | 415/229 |

* cited by examiner

*Primary Examiner* — Joseph Waks

(57) ABSTRACT

A pair of axles is rotatable about parallel axes. Each axle has a plurality of radially extending blades. A space between the axles defines a central passageway. A housing encompasses the blades. The housing has a concave front surface with a front opening and a convex rear surface with a rear opening. The central passageway extends between the front and rear openings. The housing has upper and lower surfaces. The upper and lower surfaces have apertures for rotatably receiving the axles. The front surface has lateral openings. Each opening forms a supplemental passageway. A support for each axle is provided. A lower extent of each axle extends beneath the lower surface of the housing. A generator is coupled to each axle. In this manner wind is moved through the housing. Also in this manner the axles rotate the generators. Further in this manner electrical energy is created.

1 Claim, 4 Drawing Sheets

POWER GENERATOR SYSTEM

RELATED APPLICATION

The present non-provisional patent application is based upon pending U.S. Provisional Application Ser. No. 61/395,724 filed May 17, 2010, the subject matter of which is incorporated herein by reference.

BACKGROUND OF THE INVENTION

Field of the Invention

The present invention relates to a power generator system and more particularly pertains to generating electrical energy from wind, the generating being done in a safe, efficient, economical and ecologically friendly manner.

SUMMARY OF THE INVENTION

In view of the disadvantages inherent in the known types of generator systems of known designs and configurations now present in the prior art, the present invention provides an improved power generator system. As such, the general purpose of the present invention, which will be described subsequently in greater detail, is to provide a new and improved power generator system and method which has all the advantages of the prior art and none of the disadvantages.

To attain this, the present invention essentially comprises a power generator system. First provided are two similarly configured axles. The axles are rotatable about parallel vertical axes. Each axle has a plurality of radially extending blades. The axles and blades are laterally displaced sufficiently wide. In this manner rotation of the axles and the blades is allowed without interfering with each other. The axles and blades are laterally displaced sufficiently narrow. In this manner counter rotation of the blades and axle is allowed when wind contacts the blades and moves with respect thereto. The space between the axles defines a central passageway there through for wind.

A housing subassembly is provided. The housing subassembly encompasses the axles and blades. The housing subassembly has a concave front surface. The front surface has a front opening. In this manner wind is received. The housing subassembly has a convex rear surface. The rear surface has a rear opening. In this manner wind is discharged. The housing subassembly has upper and lower surfaces. The upper and lower surfaces encompass the axles and the blades. The upper and lower surfaces have apertures. In this manner the axles are rotatably received. The front surface has lateral openings. Each opening forms a supplemental passageway. In this manner supplemental wind is channeled to contact the blades. Further in this manner the blades are moved. The housing assembly has screens. The screens cover the openings.

Further provided is a levitation support for each axle. Each levitation support includes a lower extent of each axle extending beneath the lower surface of the housing subassembly. A fixed tubular retainer is provided. The fixed tubular retainer rotatably receives the axle. The upper extent of each retainer has a disk shaped lower magnet. Each axle has a disk shaped upper magnet. The upper magnet is provided on each axle above each lower magnet. Each magnet is a rare earth magnet. Each magnet is provided in a repelling relationship with an associated magnet.

Provided last is a chamber. The chamber encompasses the lower extent of each axle and its levitation assembly. Each chamber has a generator. The generator is provided within the chamber beneath the levitation assembly. A magnetic insulation shield is provided. The insulation shield is provided between each levitation assembly and its generator, a coupling between each axle and an associated generator. In this manner movement of the wind through the housing subassembly will rotate the axles. Also in this manner the generators are rotated. Further in this manner electrical energy is created. The shaft is coupled to the housing whereby the shaft is laterally centered with respect to the housing. The majority of the mass of the housing, however, is preferably located behind the shaft.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved power generator system which has all of the advantages of the prior art generator systems of known designs and configurations and none of the disadvantages.

It is another object of the present invention to provide a new and improved power generator system which may be easily and efficiently manufactured and marketed.

It is further object of the present invention to provide a new and improved power generator system which is of durable and reliable constructions.

An even further object of the present invention is to provide a new and improved power generator system which is susceptible of a low cost of manufacture with regard to both materials and labor, and which accordingly is then susceptible of low prices of sale to the consuming public, thereby making such power generator system economically available to the buying public.

Even still another object of the present invention is to provide a power generator system for generating electrical energy from wind, the generating being done in a safe, efficient, economical and ecologically friendly manner.

Lastly, it is an object of the present invention to provide a new and improved power generator system. A pair of axles is rotatable about parallel axes. Each axle has a plurality of radially extending blades. A space between the axles defines a central passageway. A housing encompasses the blades. The housing has a concave front surface with a front opening and a convex rear surface with a rear opening. The central passageway extends between the front and rear openings. The housing has upper and lower surfaces. The upper and lower surfaces have apertures for rotatably receiving the axles. The front surface has lateral openings. Each opening forms a supplemental passageway. A support for each axle is provided. A lower extent of each axle extends beneath the lower surface of the housing. A generator is coupled to each axle. In this manner wind is moved through the housing. Also in this manner the axles rotate the generators. Further in this manner electrical energy is created.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
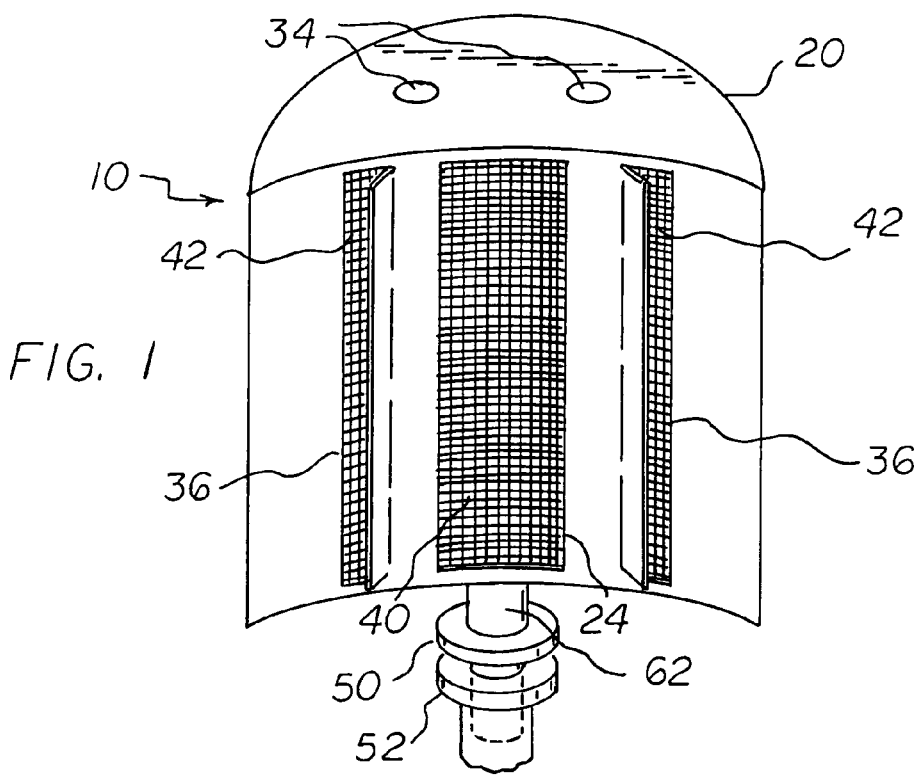
FIG. 1 is a front elevational view of a power generation system constructed in accordance with the principles of the present invention.
Figure 2:
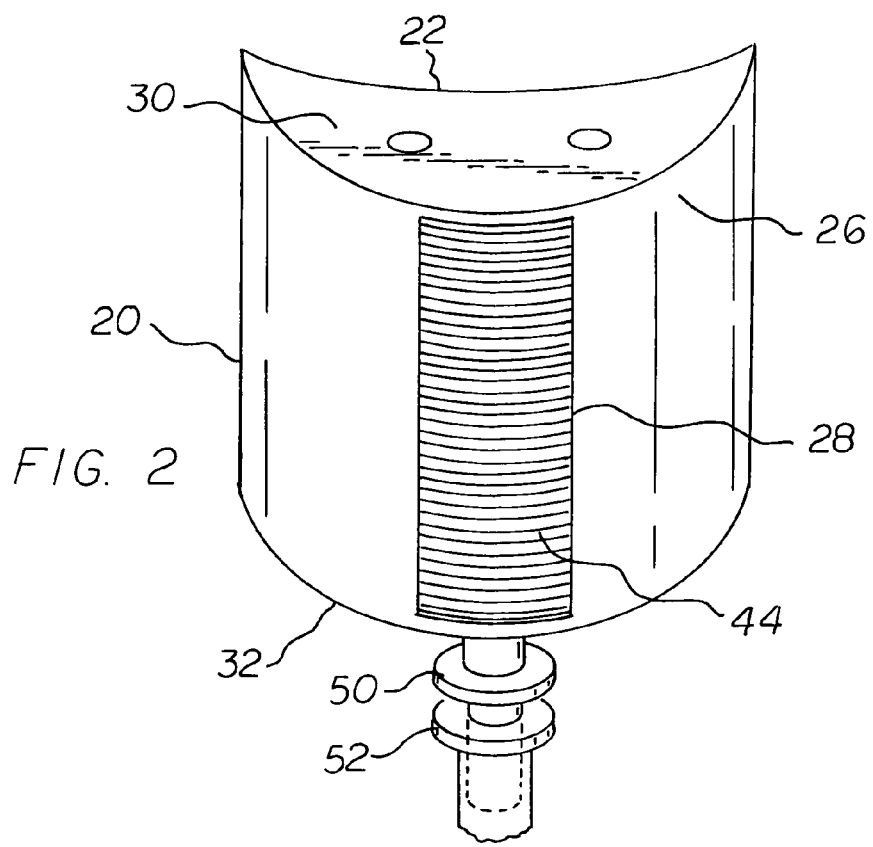
FIG. 2 is a rear elevational view of the system illustrated in FIG. 1.
Figure 3:
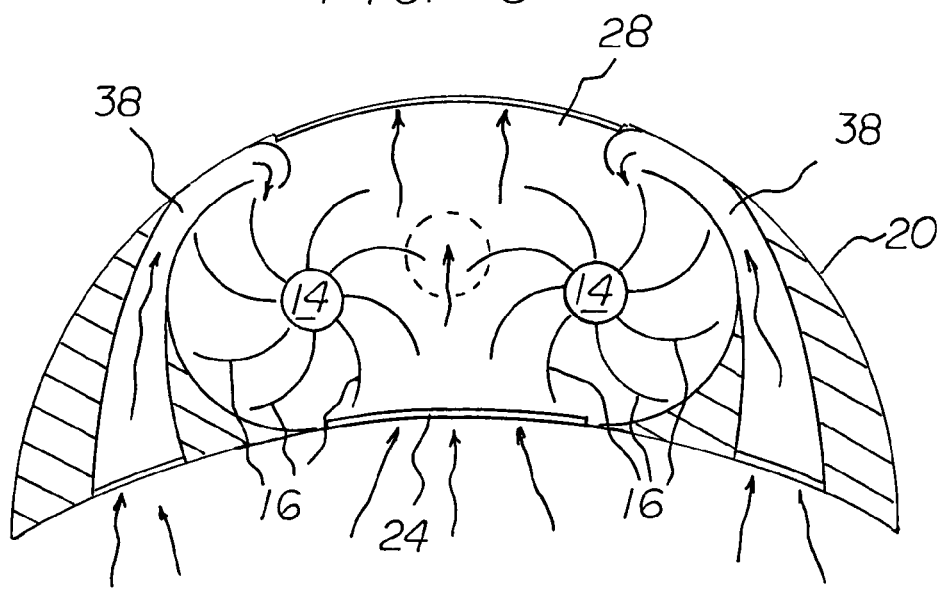
FIG. 3 is a cross sectional view taken through line 3-3 of FIG. 1.
Figure 4:
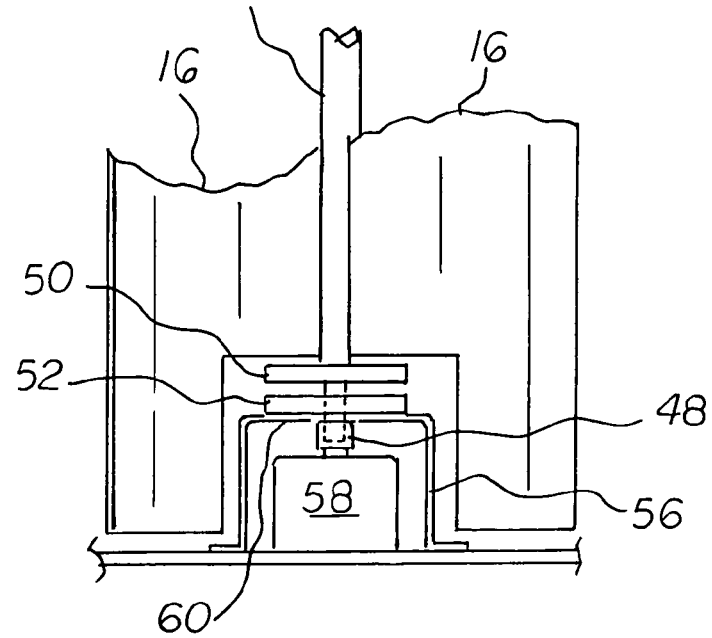
FIG. 4 is an enlarged front elevational view of the lower region of one axle and its generator.
Figure 3A:
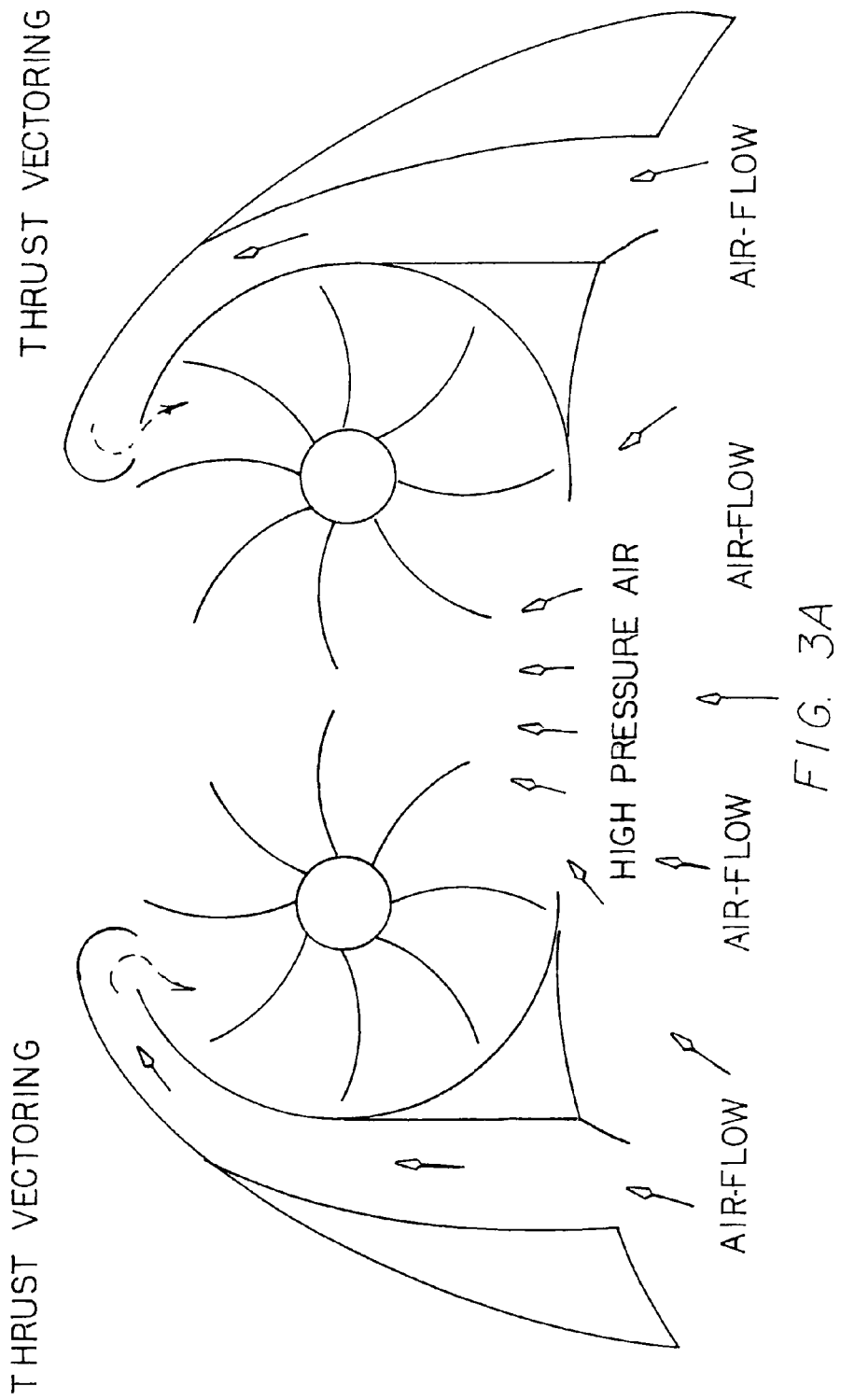
FIG. 3A is a schematic illustration similar to FIG. 3 but providing additional information as to the mode of operation.

With reference now to the drawings, and in particular to FIG. 1 thereof, the preferred embodiment of the new and improved power generator system embodying the principles and concepts of the present invention and generally designated by the reference numeral 10 will be described.

The present invention, the power generator system 10 is comprised of a plurality of components. Such components in their broadest context include a pair of axles, a housing, a support for each axle, and a generator. Such components are individually configured and correlated with respect to each other so as to attain the desired objective.

First provided are two similarly configured axles 14. The axles are rotatable about parallel vertical axes. Each axle has a plurality of radially extending blades 16. The axles and blades are laterally displaced sufficiently wide. In this manner rotation of the axles and the blades is allowed without interfering with each other. The axles and blades are laterally displaced sufficiently narrow. In this manner counter rotation of the blades and axle is allowed when wind contacts the blades and moves with respect thereto. The space between the axles defines a central passageway there through for wind.

A housing subassembly 20 is provided. The housing subassembly encompasses the axles and blades. The housing subassembly has a concave front surface 22. The front surface has a front opening 24. In this manner wind is received. The housing subassembly has a convex rear surface 26. The rear surface has a rear opening 28. In this manner wind is discharged. The housing subassembly has upper and lower surfaces 30, 32. The upper and lower surfaces encompass the axles and the blades. The upper and lower surfaces have apertures 34. In this manner the axles are rotatably received. The front surface has lateral openings 36. Each opening forms a supplemental passageway 38. In this manner supplemental wind is channeled to contact the blades. Further in this manner the blades are moved. The housing assembly has screens 40, 42, 44. The screens cover the openings.

Further provided is a levitation support for each axle. Each levitation support includes a lower extent of each axle extending beneath the lower surface of the housing subassembly. A fixed tubular retainer 48 is provided. The fixed tubular retainer rotatably receives the axle. The upper extent of each retainer has a disk shaped lower magnet 50. Each axle has a disk shaped upper magnet 52. The upper magnet is provided on each axle above each lower magnet. Each magnet is a rare earth magnet. Each magnet is provided in a repelling relationship with an associated magnet.

Provided last is a chamber 56. The chamber encompasses the lower extent of each axle and its levitation assembly. Each chamber has a generator 58. The generator is provided within the chamber beneath the levitation assembly. A magnetic insulation shield 60 is provided. The insulation shield is provided between each levitation assembly and its generator, a coupling between each axle and an associated generator. In this manner movement of the wind through the housing subassembly will rotate the axles. Also in this manner the generators are rotated. Further in this manner electrical energy is created.

Figure 5:
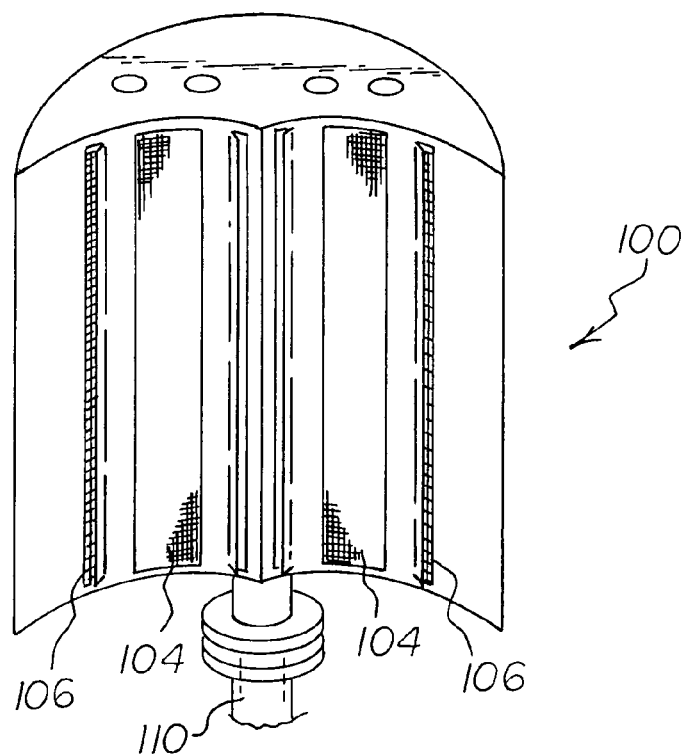
FIG. 5 is a view similar to FIG. 1 but illustrating an alternate embodiment of the levitation support.
Figure 6:
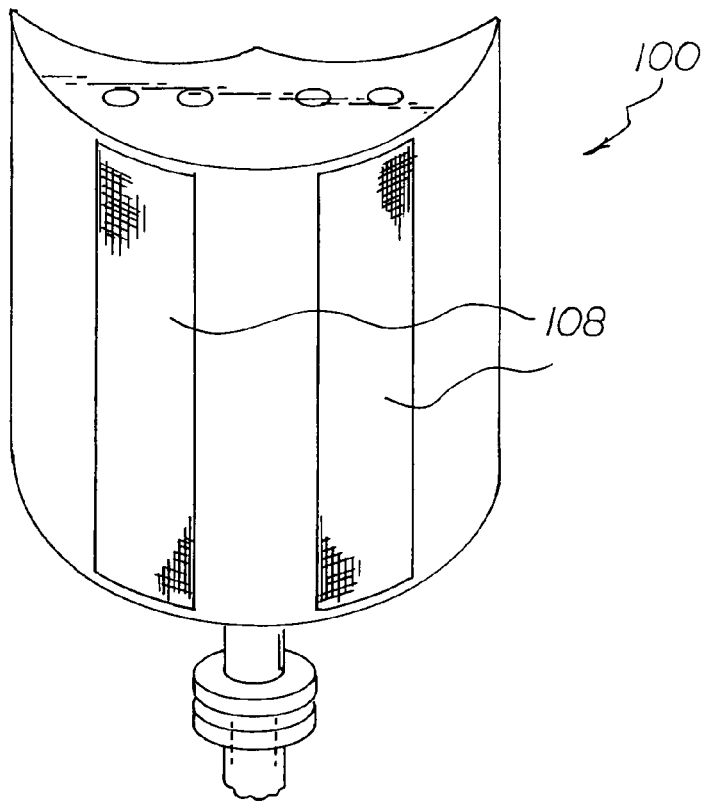
FIG. 6 is a rear elevational view of the system illustrated in FIG. 5.

Note the alternate embodiment 100 of the invention shown in FIGS. 5 and 6. A housing is provided. The housing is enlarged. The housing has two front openings 104. Each front opening has two supplemental openings 106. The housing has two rear openings 108. The system further includes a second pair of axles. The axles have blades. A pair of axles 110 is provided. A second pair of axles is also provided. The second pair of axles is of a similar construction.

In both embodiments, the shaft is coupled to the housing whereby the shaft is laterally centered with respect to the housing. The majority of the mass of the housing, however, is preferably located behind the shaft.

Bearings, as for example ball bearings, are provided at the interface between mutually rotating surfaces for securement and rotation. Typical of the rotating surfaces which employ bearings include the rotatable shaft 62 and the fixed sleeve supporting such rotatable shaft. Similar bearings are also provided between the generator 58, its output shaft and the connecting retainer 48. Lastly, similar bearings are preferably utilized at the top of the shaft 14 and the top of the housing.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A power generation system (10) for generating electrical energy from wind, the system comprising, in combination:

two similarly configured axles (14) rotatable about parallel vertical axes, each axle having a plurality of radially extending blades (16), the axles and blades being laterally displaced sufficiently wide so as to allow rotation of the axles and the blades without interfering with each other, the axles and blades being laterally displaced sufficiently narrow so as to allow counter rotation of the blades and axle when wind contacts the blades and moves with respect thereto, the space between the axles defining a central passageway there through for wind;

a housing subassembly (20) encompassing the axles and blades, the housing subassembly having a concave front surface (22) with a front opening (24) for receiving wind, the wind from the front opening contacting the blades at forward locations, the housing subassembly having a convex rear surface (26) with a rear opening (28) for discharging wind, the housing subassembly having upper and lower surfaces (30), (32) encompassing the axles and the blades, the upper and lower surfaces having apertures (34) for rotatably receiving the axles, the front surface having lateral openings (36), each opening forming a supplemental passageway (38) for channeling supplemental wind to contact and move the blades, the wind from the supplemental passageways contacting the blades at rearward locations rotationally spaced from the forward locations, the housing assembly having screens (40), (42), (44) covering the openings;

a levitation support for each axle, each levitation support including a lower extent of each axle extending beneath the lower surface of the housing subassembly, a fixed tubular retainer (48) rotatably receiving the axle, a disk shaped lower magnet (50) on an upper extent of each retainer and a disk shaped upper magnet (52) on each axle above each lower magnet, each magnet being a rare earth magnet in a repelling relationship with an associated magnet; and a chamber (56) encompassing the lower extent of each axle and its levitation assembly, a generator (58) within each chamber beneath its levitation assembly, a magnetic insulation shield (60) between each levitation assembly and its generator, a coupling between each axle and an associated generator whereby movement of the wind through the housing subassembly will rotate the axles to rotate the generators for creating electrical energy, the shaft being coupled to the housing whereby the shaft is laterally centered with respect to the housing with the majority of the mass of the housing being located behind the shaft.

\* \* \* \* \*